FIG. I

April 19, 1966  YOSHIKAZU SANDO ET AL  3,246,820
STOP DEVICE FOR APPARATUS FOR STAGNATION AND
AUTOMATIC CONVEYING OF CLOTH
Original Filed May 15, 1962  6 Sheets-Sheet 2

INVENTORS.
YOSHIKAZU SANDO
KUNIHARU NASU
KIYOSI NAKABA
BY

ATTORNEYS.

INVENTORS.
YOSHIKAZU SANDO
KUNIHARU NASU
BY KIYOSI NAKABA

ATTORNEYS.

INVENTORS.
YOSHIKAZU SANDO
KUNIHARU NASU
BY KIYOSI NAKABA

ATTORNEYS.

April 19, 1966 YOSHIKAZU SANDO ET AL 3,246,820
STOP DEVICE FOR APPARATUS FOR STAGNATION AND
AUTOMATIC CONVEYING OF CLOTH
Original Filed May 15, 1962 6 Sheets-Sheet 5

INVENTORS
YOSHIKAZU SANDO
KUNIHARU NASU
KIYOSI NAKABA
BY

McGlew & Toren
ATTORNEYS.

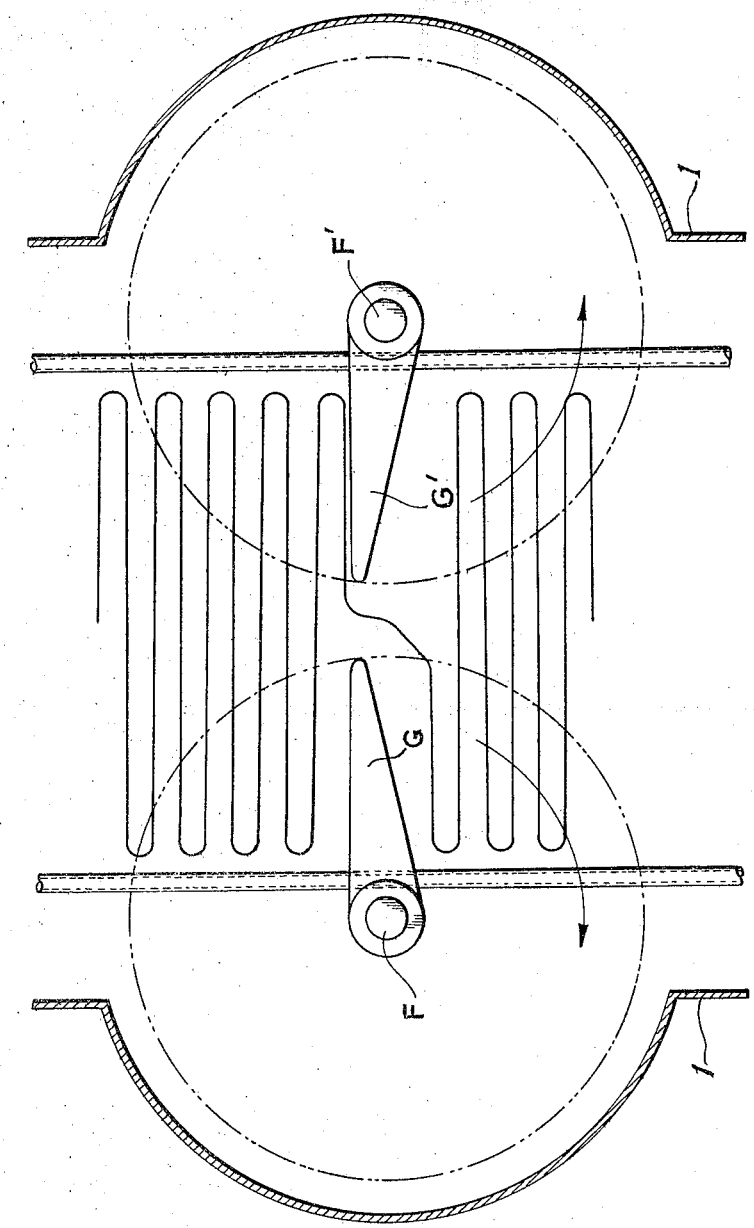

United States Patent Office 3,246,820
Patented Apr. 19, 1966

3,246,820
STOP DEVICE FOR APPARATUS FOR STAGNA-
TION AND AUTOMATIC CONVEYING OF
CLOTH
Yoshikazu Sando, 2 Chayanocho, Wakayama-shi, Waka-
yama-ken, Japan; Kuniharu Nasu, 132 Minato, Waka-
yama-shi, Wakayama-ken, Japan; and Kiyosi Nakaba,
1278 Kimidera, Wakayama-shi, Wakayama-shen, Japan
Original application May 15, 1962, Ser. No. 194,885, now
Patent No. 3,172,275, dated Mar. 9, 1965. Divided
and this application July 23, 1964, Ser. No. 387,544
Claims priority, application Japan, May 20, 1961,
36/18,041; Dec. 23, 1961, 36/47,010
5 Claims. (Cl. 226—119)

This application is a divisional application of application Serial No. 194,885, now U.S. Patent 3,172,275.

This invention relates to an apparatus for continuously effecting various processings or treatments such as desizing, scouring, bleaching, dyeing, etc., of cloth.

One feature of the invention resides in introducing a cloth treated with liquid into a reaction tower where it is both steamed and boiled so that the cloth can be processed uniformly. Advantageously, the cloth is processed without any spotting thereon by the treating liquid and the processing of the cloth is relatively low in cost.

Another feature of the invention resides in that the cloth to be treated is continuously introduced into the reaction tower; the cloth being stagnated or kept in the tower for the required period of time necessary to complete each of the unit operations, such as desizing, scouring, bleaching, dyeing, etc.

According to another feature of the invention, when the cloth is stagnated and conveyed within the reaction tower, tension is not applied to the cloth and damage thereto due to friction and the like is reduced.

According to another feature of the invention, when the cloth has stagnated and descended within the reaction tower it may be lead out of the reaction tower by being floated out of the tower on water, or the reaction liquid, which is kept in a bottom portion of the reaction tower.

One object, among others, of the invention is to provide an apparatus which will effect with high efficiency in a short time the continuous processing of cloth by such unit operations as, for example, desizing, scouring, bleaching, dyeing, etc.

In general, when the operations of desizing, scouring, bleaching, dyeing, etc. are effected on a long size cloth, it is necessary to dip the cloth into a treating liquid and to keep the cloth in the gas, vapor or moisture generated from the liquid for a certain time period. If this processing is automatically and continuously effected, the greater the moving speed of cloth, the longer the treatment apparatus must be. Of course, this requires a relatively greater capital expenditure.

According to another feature of the present invention, cloth receiving shelves are provided on a conveyor chain belt at regular intervals. The cloth being continuously fed into a reaction tower is piled on these shelves and is stagnated thereon. Then the cloth is caused to descend through the tower with the shelves automatically. This operation is repeated several times to stop or stagnate the cloth in the liquid, repeatedly, in order to improve the permeation of liquid and gas into the cloth. Therefore, according to the present invention, there is provided cloth, or textile, processing apparatus which is relatively small and, as a result, inexpensive.

According to another feature of the invention, there is provided means to stop the descent of the cloth receiving shelves; said means being provided within the cloth stagnation area, intermittently.

According to the present invention, cloth padded with a chemical liquid is introduced into the upper portion of the reaction tower of the enclosed type. The cloth is shaken down or folded, by means of a shaker device, on cloth receiving plates which are provided on an inner wall of the tower at suitable intervals. The piled cloth is intermittently conveyed downwardly at regular time intervals, or by a constant amount at irregular time intervals. Then the cloth is continuously led out of the tower bottom while the cloth is floating in the boiling water or treatment liquid which is kept in the bottom portion of the reaction tower. Thus, when the cloth padded with the treatment liquid is stagnated and conveyed within the reaction tower without tension or abrasion thereof, it is subjected to heat treatment by steaming and the processing of the cloth is attained with high efficiency. Furthermore, by means of boiling water, or the reaction liquid in the bottom portion of the reaction tower, the treatment spots due to the steaming are removed and a uniform processing of the cloth is accomplished.

The present invention relates particularly to an apparatus for stagnation and automatic conveying of cloth as well as to a device for intermittently stopping the movement of oppositely arranged cloth receiving shelves. The aforesaid apparatus and stopping device are used in conjunction with said reaction tower or stagnation and conveying tank.

According to an illustrative embodiment of the invention, a pair of chain wheels arranged for intermittent rotation are provided on both the right and left sides within a stagnation tank. A number of cloth receiving members, or shelves, are pivoted at regular intervals on chain belts which are engaged with the chain wheels. The members, or shelves, are so arranged that each shelf hangs on the outside of a chain belt and is held horizontally with respect thereto. The cloth receiving members, or shelves, associated with the right and left chain belts extend horizontally toward each other. The cloth receiving members, or shelves, are moved through said regular intervals with every rotation of the chain wheels.

Further, according to the invention, pairs of stepped cloth receiving shelves are provided at constant intervals vertically on both sides within the appartus for the stagnation and the automatic conveying of the cloth, as well as in the cloth stagnation tank. Cloth, continuously fed thereinto, is piled and stagnated on these shelves. Then the cloth is dropped successively onto lower cloth receiving shelves at every rotation of these shelves. Thus, there is accomplished the automatic conveying of cloth by means of cloth receiving shelves which are restored to their original positions every cycle. According to the apparatus provided by the invention, cloth piled layers containing a considerable weight of liquid may be safely and thoroughly stagnated and conveyed downwardly.

The various features of novelty which characterize the invention are pointed out with particuarity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 9 is a schematic drawing of another embodiment of the cloth conveying apparatus, according to the invention.

*Example 1*

Figure 1:
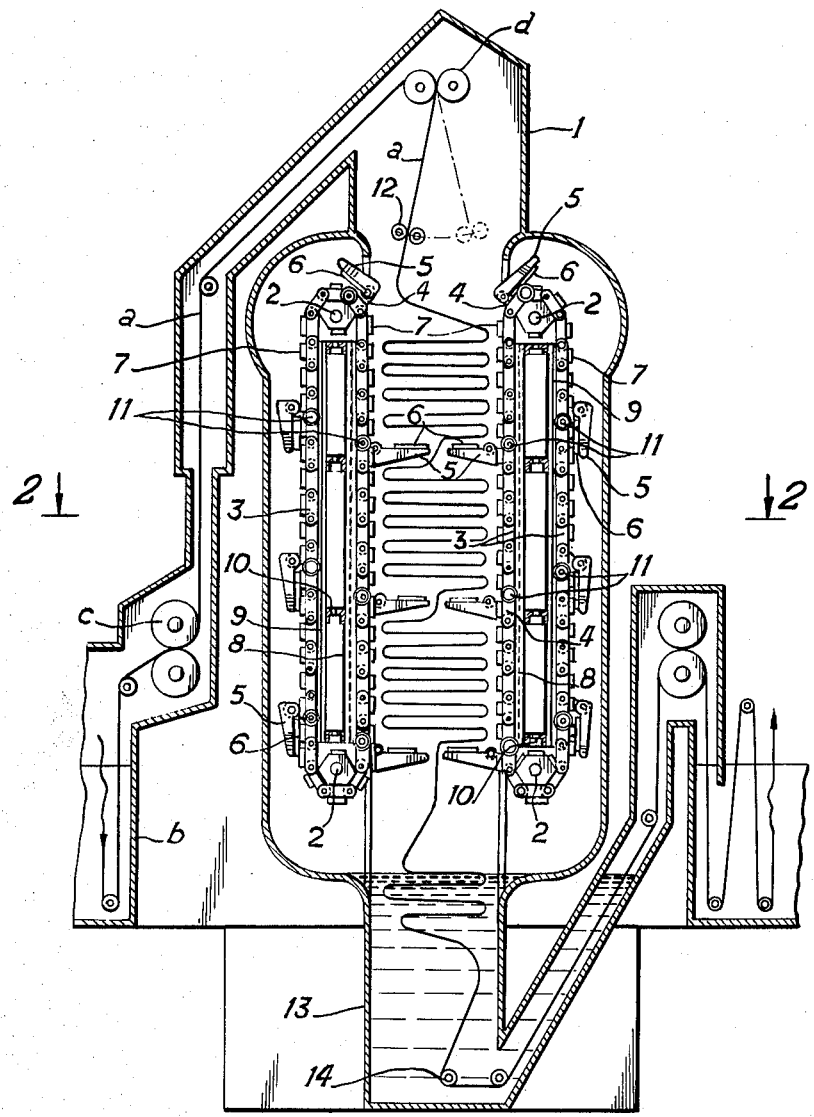
FIG. 1 is a vertical section of an exemplary embodiment of the apparatus according to the invention for the stagnation and automatic conveying of cloth; said apparatus having chain conveyor type cloth receiving shelves.
Figure 2:
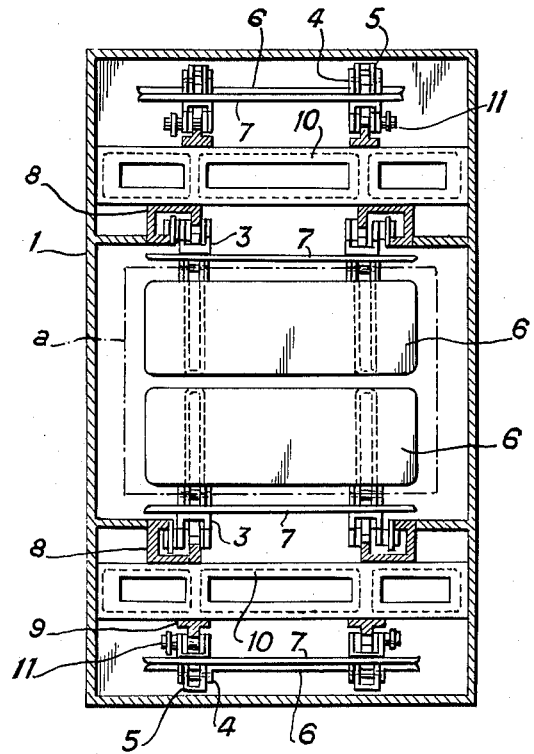
FIG. 2 is an enlarged cross sectional view taken along the section line 2—2 of FIG. 1.

This example pertains to the apparatus for the stagnation and the automatic conveying of cloth according to FIGS. 1 and 2. A pair of upper and lower chain drive wheels 2 is provided symmetrically on right and left sides within a stagnation tank 1. These chain drive wheels 2 are so driven that they are stopped a number of times for a little while with every rotation thereof. These chain drive wheels 2 may be hexagonally-shaped as in FIG. 1. A pair of the chain drive wheels 2 is respectively engaged with a conveying chain belt 3, on which special chains 4 are provided at intervals of length traveled during one rotation of a chain wheel. Cloth receiving arms 5 are pivoted, respectively, on the special chains 4. The cloth receiving shelves 6 are mounted, respectively, on the arms 5. Side walls 7 are provided on outer faces of the chain belt 3. For maintaining the horizontal alignment of the cloth receiving shelves 6 and the vertical alignment of the side walls 7, the guide rails 8 (for horizontal alignment), and the guide rails 9 (for the returning sides of the chain belt 3) are provided on both sides of the beams 10. The special chains 4 are provided with rollers 11 having one side flange. The rollers 11 are held between the grooves of the guide rails 8 to hold the cloth receiving shelves 6 horizontally with respect to the chain belts 3.

The apparatus operates as follows:

A long size cloth *a* passes through a washing tank (not shown) to enter a chemical liquid tank *b*, where the cloth is saturated with the chemical fluid (for instance, acidic solution of sodium chlorite, in securing and bleaching) and the cloth is squeezed by a mangle *c*. Then the cloth is carried to the upper part within the stagnation tank 1 where it passes through the guide rollers *d* and is shaken downwardly by a shaker means 12 which functions to fold and pile up the cloth on the cloth receiving shelves 6 which project toward each other from both chain belts 3. The cloth *a* is subjected to steam as it is carried up to the guide rollers *d*. When the cloth is folded and has piled up in these folds a predetermined amount, the chain wheels 2 make one rotation and are stopped for a little while by a suitable means. Then the conveying chain belts 3 engaged with the chain wheels 2 are rotated and the inner belt portions thereof are moved downwardly a certain distance together with the cloth receiving shelves 6, on which the folded and piled cloth is supported, to a second position (see FIG. 1). Also, the uppermost cloth receiving shelves 6 are moved downwardly together with the chain belts 3 to the first position. Thus, the cloth is repeatedly shaken down and piled up on the shelves. When the cloth has been piled up by a predetermined amount, the chain wheels 2 are rotated and the cloth receiving shelves 6 are moved down a predetermined distance and are stopped at the second position. In the same manner as hereinbefore mentioned, the cloth receiving shelves 6 at the second position are shifted to the third position. In this way, automatic feeding of the cloth *a* through the tank 1 is repeated intermittently. It descends, stops and stagnates at several positions. When the cloth reaches the lowermost position, it drops into a liquid tank 13 which is filled with a chemical liquid or water and may be heated by blowing steam thereinto. Then it is sent to the next unit operaiton; for example, to the washing tank, or the like, through the guide rollers 14 which are provided at the bottom of the tank.

In the example just described, the cloth is piled and stagnated within a space enclosed by the cloth receiving shelves 6 and side walls 9 and descends through the tank with them so that no tension will be imposed on the cloth. Thus, there is no possibility of the cloth rubbing against the side walls or the cloth receiving shelves, whereby abrasion damage to the cloth is avoided. In the stagnation tank, the cloth is allowed to stagnate on each of the receiving shelves. These shelves are, as shown in FIG. 1, arranged in many steps so that the pressure due to dead weight of the cloth is made as small as possible at each step, thus avoiding extensive bending of the cloth, thereby preventing injury of its quality. Also, the stepwise arrangement of the shelves aids in preventing tension from being imparted to the cloth as it is being processed.

The cloth is stagnated on the receiving shelves for a predetermined time period and shifted successively to repeat the stagnation operation several times, while chemical liquid gas and the like sufficiently permeates into the textile. Thus, the treatment is effective to enable the attainment of a relatively large amount of cloth of uniform quality throughout.

By using large sized cloth receiving shelves, a large amount of cloth may be piled up. Therefore, if the cloth is fed into the tank at high speed, it may be expeditiously processed by the approximate speed controlling of each part of the mechanism and by increasing the number of positions which the cloth receiving shelves assume during the downward descent.

The stagnation tank may be made long in the vertical direction and together with the stagnation devices, the volume of the tank may be made as small as possible so that not so large a space is required to accommodate the apparatus. Advantageously, the cost thereof may be reduced considerably.

*Example 2*

This example relates to an intermittent rotation stopping device, applicable to the apparatus for stagnation and automatic conveying of cloth having chain conveyer type cloth receiving shelves.

Figure 3:
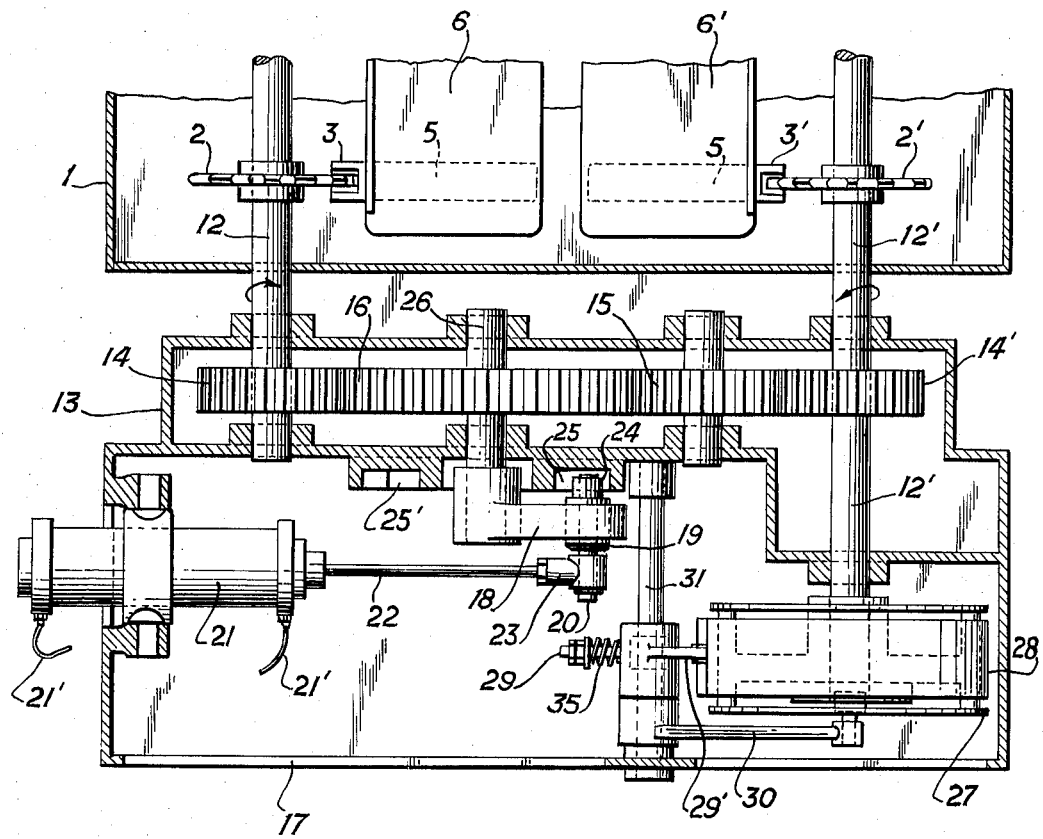
FIG. 3 is a plan view of the intermittent stopping device for rotating shafts of the oppositely arranged cloth receiving shelves used in the apparatus shown in FIG. 1.

In FIG. 3, there is a stagnation tank 1, in which cloth receiving shelves 6, 6' are mounted on the receiving arms 5, which are fixed with the chain drive wheels 2 and 2', respectively, and are pivotally connected to the conveying chains 3, 3', respectively. As shown, the chain wheel shafts 12 and 12' extend outwardly from a gear box 13.

On the rotatable shafts 12 and 12', the gears 14 and 14', which have equal diameters, are fixedly mounted. Between the intermediate idler gears 15 and 14, there is arranged a driving gear 16 which has twice the number of teeth than either of the gears 14 or 14'. The driving gear 16 is connected with a rotary arm 18 within a gear box 17.

Figure 4:
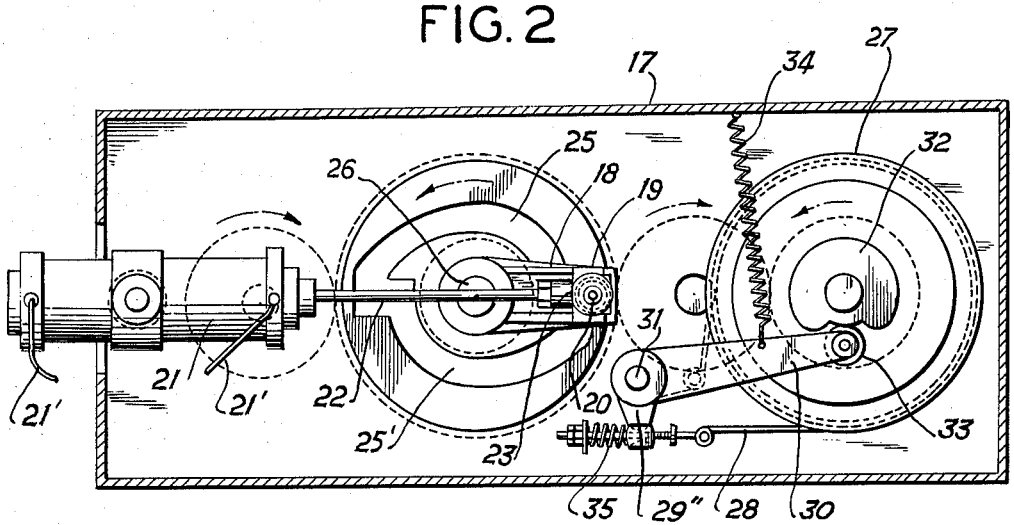
FIG. 4 is a side view of the stopping device of FIG. 3.
Figure 5:
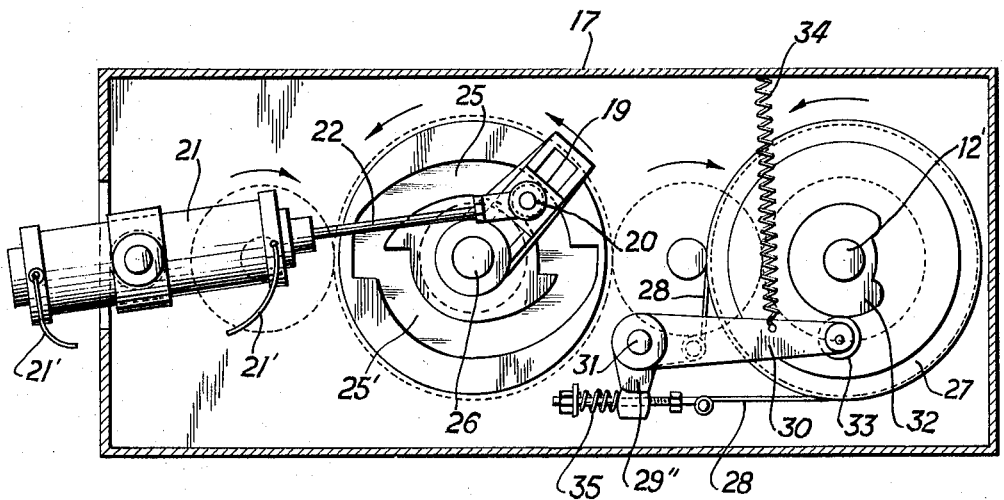
FIG. 5 is also a side view of the stopping device of FIG. 3 showing it in a particular state of rotary operation.

As shown in FIGS. 4 and 5, the arm 18 is provided with a long groove 25–25', to which a square shaped small bearing 19 is fitted so as to be able to slide freely along the axis of arm 18. A cam roller shaft 20 is fitted to this small bearing 19, with which a small metal piece 23 is also combined. The metal piece 23 is engaged with an end of a piston rod 22 of a pressurized air, or pressurized oil cylinder 21. Also, on another end of the shaft 20, a cam roller 24 is fitted. This cam roller 24 is assembled so as to enter into the cam groove 25–25'.

On the cloth receiving shelves 6 and 6', there is a piled layer of cloth, as shown in FIGS. 1 and 2, containing moisture. The cloth receiving shelves 6, 6' are positioned in several stages or steps resulting in a considerable total weight which imparts a large force downwardly at all times. Due to this force, the shafts 12 and 12' are always constrained to rotate inwardly in the direction of arrows, as indicated in FIGS. 4 and 5.

Gears 14 and 14', which are fixed to the chain wheels 12 and 12', are in meshing engagement with the idler gear 15 and with the larger driving gear 16 and are, as a result, rotated in the direction of arrows, respectively.

To cause these gears to either stop or rotate in one turn, cam roller 24 and cam groove 25–25' are utilized.

Figure 6:
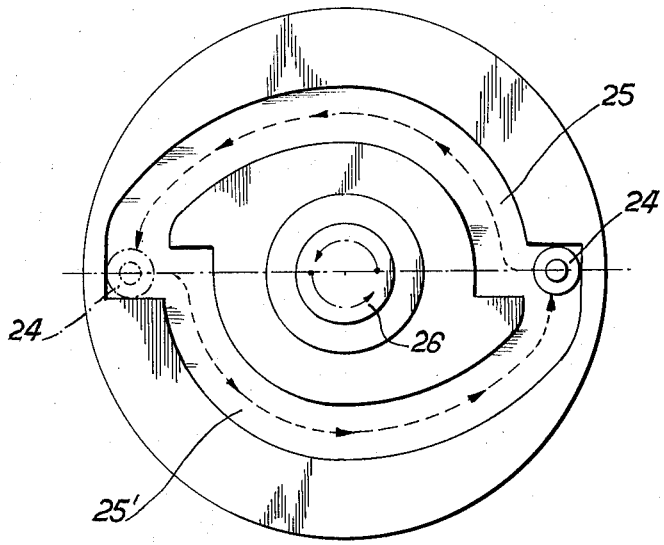
FIG. 6 is a drawing of mechanism showing the relation between the rotary guide cam groove and the cam roller in FIG. 5.

In FIG. 6, there is shown in dotted lines and arrows the motion of cam roller 24 as it moves along the cam grooves 25–25'.

In FIG. 6, the cam roller 24 is illustrated as abutting against cam roller stopping positions in the extremities of the cam groove 25–25' whereat no further circular motion of the cam roller 24 can occur; i.e., rotative movement is stopped.

In the condition shown in FIG. 6, the cam roller 24 and the arm 18 are both stopped. Also, the shaft 26 and the large gear 16 connected therewith will be stopped and the other gears will not be able to move. Thus, when the cloth receiving shelves try to move downwardly due to the weight of cloth and try to rotate the chain wheels 2, 2' and their shafts 12, 12', such attempted motions are completely prevented because of the aforesaid stopping positions of the cam groove 25–25' which are formed as cam roller stoppers.

Now, when it is desired to start rotational movement, high pressure air or oil is supplied through a pipe 21' to an air or oil cylinder 21, wherein a piston is drawn to the rear part of the cylinder, so that the piston rod 22 and the metal piece 23 are moved to the left, according to the orientation shown in FIGS. 4 and 5. As a result, the square small bearing 19 fitted in the long groove of the arm 18 will be moved along the axis of arm shaft 26. As shown in FIG. 6, when the cam roller 24 arrives at that portion where the groove 25 is circular, the arm shaft 26 will start to rotate about its own axis owing to the weight of cloth, whereby the roller 24 will rise upwardly and move around along the cam groove until it comes to the stopping position at the opposite side of the cam groove and abuts against the rectangular stopping portion thereby stopping further movement.

When the arm shaft 26 makes a half revolution, the chain wheel shafts 12, 12' make one complete revolution because the larger gear 16 fixed on the other end of the arm shaft 26 has a diameter dimension twice that of the gears 14, 14'.

When high pressure air, or oil, is supplied from a pipe 21' on the rear portion of the cylinder 21, the piston rod 22 is pushed outwardly from the cylinder 21 and moves horizontally, thereby moving in a semicircular locus along the lower cam groove 25', whereby the cam roller 24 is returned to its original stop position. By this movement there is made one revolution of the chain wheel shafts 12, 12' which are also stopped at this stopping position.

A direct collision or impact of the cam roller 24 with the stopping portion of the cam groove 25 may cause some troubles. For preventing such troubles, the chain wheel shaft 12' is elongated and extends, as shown in FIG. 3, into the inner portion of the driving gear box 17. A brake wheel 27 is fixed thereto. A brake band 28 is wound around the periphery of the brake wheel 27. One end of the brake band 28 is connected to an end of an upper link arm or lever 29', and the lower end thereof is fixed by suitable pin means on a screw rod 29, which acts with a spring 35 to connect with another lower link arm 29''. In FIG. 3, only the upper link arm or lever 29' is visible. However, the lower link arm or lever 29'' is shown in FIGS. 4 and 5.

Link arms or levers 29', 29'' project at right angles from a common metal boss which is fixed on a brake shaft 31, together with a brake arm 30. Both link arms 29' and 29'' can move semicircularly. A brake cam 32 is fitted on the outside of the brake wheel 27 at the end of the rotary shaft 12'. Also, a brake cam roller 33 is combined with the brake arm 30 and is pulled up by a tension spring 34 so as to contact with the periphery of the cam 32 constantly.

As shown in FIG. 4, when the rotary shaft 12' is stopped, the cam roller 33 is pulled up in abutment with the notched portion of the cam 32 by means of the spring 34, while frictional contact of the brake band 28 with the brake drum or wheel 27 is relaxed. When the shaft 12' is rotated by the driving means and is accelerated by the weight of piled layer of cloth, then, as shown in FIG. 5, the brake cam roller 33 will mount the uppermost peripheral surface of the brake cam 32 and the brake band 28 will be automatically tightened by the brake lever link arms 29', 29'' to effect uniform rotation of the shaft 12'. FIG. 5 shows the condition obtained when the driving roller-carrying arm 18 is rotated through a 45° angle, wherein the shaft 12', carrying the brake cam 32, is rotated through about twice such an angle (90°).

Over-tightening of the brake band 28 may be compensated for by adjusting the restraining force of the spring 35, whereby the brake drum 27 will slowly continue its rotary motion due to the action of air or oil pressure cylinder. Eventually, the cam roller 33 will enter into the notched portion of the brake cam 32 and, as a result, the brake drum 27 is released for free rotation; the action of the brake being discontinued and shocks to the mechanism being prevented.

It is for the purpose of ensuring smooth rotary motion by eliminating the imposition of retarding forces at next starting that the brake band 28 is relaxed when the brake mechanism is stopped.

In this way it is possible to make on rotation and a stop. In addition, by making use of a suitable timer or the like, electric current can be supplied to electromagnetic valve means to control the flow of air or oil pressure at proper times to assure an intermittent automatic feeding of the cloth through the apparatus.

In the above-described example, the oppositely arranged rotary shafts 12, 12' are caused to make intermittent rotations. They are stopped during every one rotation. However, the invention is by no means limited to an intermittent rotational movement during every one rotation. For example, the shafts 12, 12' may be made to effect intermittent rotation and stop during other optional rotation angles such as 2, 1½, ¾, ½, ¼ rotations, etc. Namely, the rotation angles of intermittent rotation and stoppage of the rotating shafts 12, 12' may be suitably determined in connection with the intermittent rotating distance of the chain conveyer mhich rotates in engagement with said shafts, the piling speed of the cloth and the fitting intervals of cloth receiving shelves, etc.

*Example 3*

Figure 7:
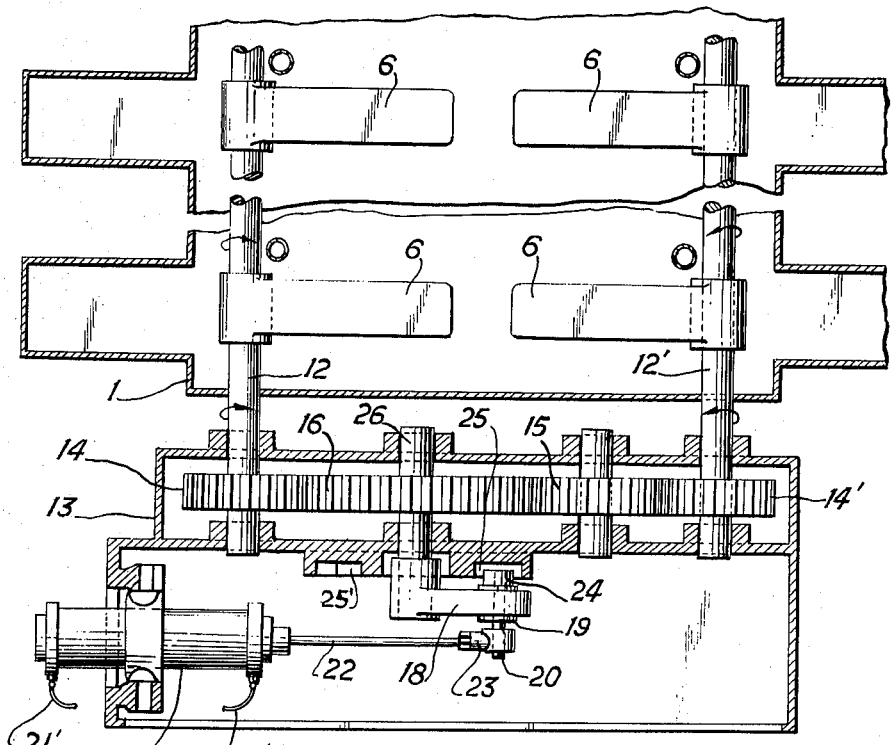
FIG. 7 and FIG. 8 are plan and side elevations with partial sections, respectively, of the intermittent stop device for rotating the shaft of the cloth receiving shelves, which are applied to the cloth conveying apparatus shown in FIG. 6.
Figure 8:
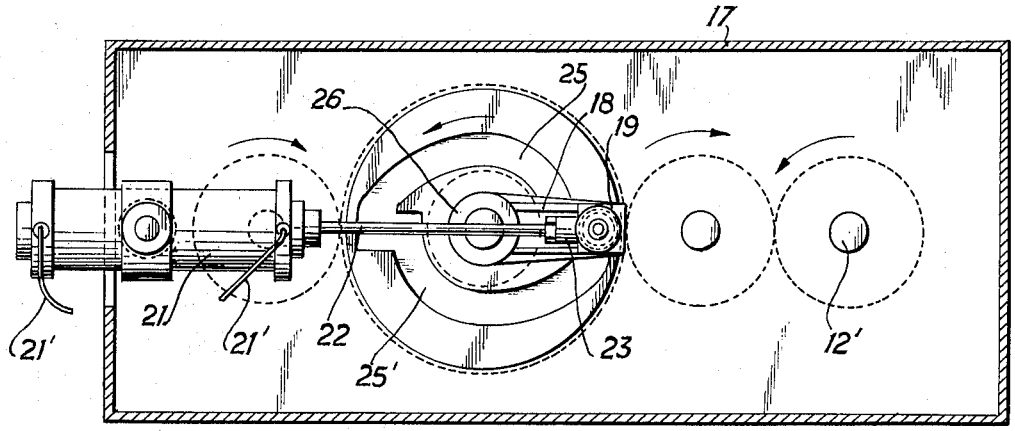

This example relates to a rotation stopping device shown in FIGS. 7 and 8. This device is applied to an apparatus for the stagnation and the automatic conveying of cloth, as shown in FIG. 9, which employs cloth receiving shelves of a type which will return to their original positions during each rotation. In FIG. 9, more than one pair of rotary shafts F, F' are oppositely arranged along the sides of the stagnation tank 1 in a vertical direction at suitable intervals. On the rotary shafts F, F' the cloth receiving shelves G, G' are fixed and they project toward each other. Many such pairs of shelves G, G' may be arranged stepwise within the tank, and by the intermittently acting stopping mechanism which stops the rotary shafts F, F' during every one rotation, the cloth layer piled up on the upper cloth receiving shelves is successively and intermittently conveyed onto lower situated cloth receiving shelves.

The driving means (shown in FIGS. 7 and 8) for this device is approximately the same as that of Example 2.

The cloth receiving shelves 6, 6' (FIG. 7) are respectively rotated by one rotation of the rotary shafts 12, 12' in the direction of arrows shown, and these shelves are returned to their original positions; the piled cloth being further dropped as it is piled up on the lower shelves.

In this example, the driving means required are as many as the number of steps of the cloth receiving shelves, while fewer parts are required for the braking devices.

In such case, the cloth receiving shelves, which drop the piled layers of cloth onto lower steps during rotation of the shelves, will return to their original positions. As a result, fewer shocks have to be absorbed because the large driving gear 16 is divided into a peripheral gear portion and an inner wheel portion which is fixed to the shaft and assembled in a flange by means of both side faces, within which shock absorbing springs (6–16 pieces) are enclosed to reduce shocks.

In such case, on rotation and stop mechanism is employed for returning the cloth receiving shelves to the horizontal position to receive the cloth with every one rotation of the rotary shaft. However, if it is so arranged that the cloth receiving shelves are respectively projected on the right and left of each of the rotary shafts F, F', another rotation and stop mechanism with every half rotation may be used, so that the invention is by no means limited to one rotation and half rotation, but can be used with driving apparatus for intermittent motion which is stopped after predetermined rotations.

While specific embodiments of the invention have been shown and described in detail to illustrate the application of the inventive principles, it will be understood that the invention may be embodied otherwise without departing from such principles.

What is claimed is:

1. An intermittent rotation stop device in an apparatus for stagnation and automatic conveying of cloth, wherein a piled cloth is supported on cloth receiving shelves oppositely projecting from both sides of a stagnation tank for processing of cloth, which device includes two opposite shafts for rotating said cloth receiving shelves which are mechanically connected with driving gears so as to be rotated synchronously, a control shaft driven by said driving gears, a member having a long cam groove adjacent said control shaft, a cam roller confined in said groove and carried by said control shaft, said cam groove being formed by two semicircular grooves of substantially equal size offset radially at opposite diametrical ends to form two stop abutments, and a mechanism operated by fluid pressure connected to said cam roller to displace said roller off said abutments to permit intermittent rotations of the shafts of said cloth receiving shelves, accompanied with the movement of said cam roller along the semicircular grooves to the next stop abutment.

2. A rotation stop device for an apparatus including first and second conveyors each including a rotatable shaft subject to rotation in opposite respective directions under the influence of the weight of articles carried by the conveyor, comprising a rotatable cam control shaft, gear means for connecting said cam control shaft to the conveyor shafts, a stationary annular cam, a cam follower connected to said cam control shaft for rotation therewith and positioned to ride on said annular cam, means mounting said cam follower on said cam control shaft for rotation therewith and also permitting independent displacement of said follower, said cam having at least one abutment thereon defining a stop preventing rotation of said cam control shaft, and means connected to said cam follower for shifting said follower out of alignment with said abutment to permit the rotation of said cam control shaft and hence the conveyor shafts.

3. A rotation stop device according to claim 2, wherein said gear means includes a relatively large diameter gear connected to said cam control shaft for rotation therewith, and relatively small diameter gears connected to each of said conveyor shafts.

4. A rotation stop device according to claim 2, wherein said stationary cam comprises a member having an annular groove with abutments formed at diametrically opposite locations thereon.

5. A rotation stop device according to claim 2, wherein said means connected to said cam follower for shifting said cam follower includes a fluid actuated piston.

References Cited by the Examiner

UNITED STATES PATENTS

| | | | |
|---|---|---|---|
| 1,107,160 | 8/1914 | Macadam | 68—177 X |
| 1,220,268 | 3/1917 | Payet | 68—177 X |
| 1,246,993 | 11/1917 | Payet | 68—177 X |
| 1,655,090 | 1/1928 | Cunningham | 221—295 |

M. HENSON WOOD, JR., *Primary Examiner.*

ALLEN N. KNOWLES, *Assistant Examiner.*